United States Patent
Li et al.

(10) Patent No.: US 10,305,277 B1
(45) Date of Patent: May 28, 2019

(54) ANTI-SHORT-CIRCUIT INTEGRATED CHIP AND TERMINAL FACILITY

(71) Applicant: Shenzhen China Star Optoelectronics Technology Co., Ltd., Shenzhen, Guangdong (CN)

(72) Inventors: Wenfang Li, Guangdong (CN); Xianming Zhang, Guangdong (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 15/939,899

(22) Filed: Mar. 29, 2018

Related U.S. Application Data

(63) Continuation of application No. PCT/CN2018/072610, filed on Jan. 15, 2018.

(30) Foreign Application Priority Data

Dec. 27, 2017 (CN) .......................... 2017 1 1456519

(51) Int. Cl.
*H02H 9/02* (2006.01)
*H02H 9/08* (2006.01)
*H01H 85/048* (2006.01)

(52) U.S. Cl.
CPC ............ *H02H 9/08* (2013.01); *H01H 85/048* (2013.01); *H02H 9/02* (2013.01); *H01H 2085/0486* (2013.01)

(58) Field of Classification Search
CPC .................................. H02H 9/02; H02H 9/08

USPC ................................................ 361/93.1, 93.9
See application file for complete search history.

(56) References Cited

U.S. PATENT DOCUMENTS

| 4,282,422 A | * | 8/1981 | Payne ................ G05D 23/1913 |
| | | | 219/448.12 |
| 2002/0038902 A1 | | 4/2002 | Naiki |

FOREIGN PATENT DOCUMENTS

| CN | 101752852 A | 6/2010 |
| CN | 201699387 U | 1/2011 |
| CN | 203813425 U | 9/2014 |
| CN | 102956635 B | 11/2015 |
| CN | 105097773 A | 11/2015 |
| CN | 204927217 U | 12/2015 |
| CN | 106298770 A | 1/2017 |
| CN | 107171291 A | 9/2017 |
| CN | 206650072 U | 11/2017 |
| JP | 5-251532 A | 9/1993 |

* cited by examiner

*Primary Examiner* — Dharti H Patel
(74) *Attorney, Agent, or Firm* — Hauptman Ham, LLP

(57) ABSTRACT

The disclosure provides an anti-short-circuit integrated chip and terminal facility. The integrated chip comprises: a control unit having a first output terminal configured for outputting a first signal and a second output terminal configured for outputting a second signal; and an insurance apparatus having a first insurance part connected to the first output terminal and a second insurance part connected to the second output terminal. The insurance parts are configured for limiting the currents flowed through the insurance parts when the currents flowed through the insurance parts exceed the current threshold. The chip device can be protected from being damaged when there is short circuit.

8 Claims, 2 Drawing Sheets

US 10,305,277 B1

ANTI-SHORT-CIRCUIT INTEGRATED CHIP AND TERMINAL FACILITY

RELATED APPLICATIONS

This application is a continuation application of PCT Patent Application No. PCT/CN2018/072610, filed Jan. 15, 2018, which claims the priority benefit of Chinese Patent Application No. 201711456519.0, filed Dec. 27, 2017, which is herein incorporated by reference in its entirety.

FIELD OF THE DISCLOSURE

The disclosure relates to an electronic circuit technical field, and more particularly to an anti-short-circuit integrated chip and terminal facility.

BACKGROUND

Integrated chip is a circuit with specific functions made by using semiconductor technology or thick film, thin film technology to interconnect transistors, resistors, capacitors, other electronic components and wirings together, manufactured on a dielectric substrate, and packaged in a tube. Compared with discrete devices, integrated chips are widely used in consumer electronics, network communications, electronic equipment, industrial control and military because of their advantages of small size, low power consumption, good performance, high reliability and low cost.

As electronic devices play more and more important roles in people's lives, security issues of them should not be underestimated. In the integrated chip, the external circuit short-circuit often leads to damage the chip, which results in replacing the chip. When the incident is serious, the chip may emit smoke and cause a security incident. In the existed technologies, the protection circuit is added on the external circuit, which not only improves the circuit complexity but also detrimental to the flexible use of the integrated chip.

SUMMARY

The embodiments of the disclosure provide an anti-short-circuit integrated chip and terminal facility to protect the chip from being damaged when the external circuit is short-circuited or over-loaded.

In a first aspect, the present disclosure provides an anti-short-circuit integrated chip, comprising:

a control unit disposed in a chip body, comprising a first output terminal and a second output terminal, wherein the first output terminal is configured for outputting a first signal, and the second output terminal is configured for outputting a second signal; and an insurance apparatus disposed in the chip body, comprising a first insurance part and a second insurance part, the first insurance part being connected to the first output terminal, the second insurance part being connected to the second output terminal, the first insurance part being configured for limiting a current flowed through the first insurance part when the current flowed through the first insurance part exceeds a current threshold, and the second insurance part being configured for limiting a current flowed through the second insurance part when the current flowed through the second insurance part exceeds the current threshold.

In some possible implementations combining the first aspect, the first signal is a periodic signal with positive and negative alternating, the second signal is in 180° phase difference with the first signal, and a voltage difference between the first signal and the second signal is kept at a constant difference value.

In some possible implementations combining the first aspect, the insurance apparatus is a recoverable fuse device; the recoverable fuse device is low impedance when a device current does not exceed the current threshold and is high impedance when the device current exceeds the current threshold, wherein the device current is a current flowed through the recoverable fuse device.

In some possible implementations combining the first aspect, the recoverable fuse device is a polymer resin fuse.

In some possible implementations combining the first aspect, a volume of the polymer resin fuse decreases when the device current does not exceed the current threshold so that the polymer resin fuse is low impedance; and the volume of the polymer resin fuse increases when the device current exceeds the current threshold so that the polymer resin fuse is high impedance.

In a second aspect, the present disclosure provides an anti-short-circuit terminal facility, comprising:

a terminal body and an integrated chip, wherein the integrated chip comprises:

a control unit disposed in a chip body, comprising a first output terminal and a second output terminal, wherein the first output terminal is configured for outputting a first signal, and the second output terminal is configured for outputting a second signal; and an insurance apparatus disposed in the chip body, comprising a first insurance part and a second insurance part, the first insurance part being connected to the first output terminal, the second insurance part being connected to the second output terminal, the first insurance part being configured for limiting a current flowed through the first insurance part when the current flowed through the first insurance part exceeds a current threshold, and the second insurance part being configured for limiting a current flowed through the second insurance part when the current flowed through the second insurance part exceeds the current threshold.

In some possible implementations combining the second aspect, the first signal is a periodic signal with positive and negative alternating, the second signal is in 180° phase difference with the first signal, and a voltage difference between the first signal and the second signal is kept at a constant difference value.

In some possible implementations combining the second aspect, the insurance apparatus is a recoverable fuse device; the recoverable fuse device is low impedance when a device current does not exceed the current threshold and is high impedance when the device current exceeds the current threshold, wherein the device current is a current flowed through the recoverable fuse device.

In some possible implementations combining the second aspect, the recoverable fuse device is a polymer resin fuse.

In some possible implementations combining the second aspect, a volume of the polymer resin fuse decreases when the device current does not exceed the current threshold so that the polymer resin fuse is low impedance; and the volume of the polymer resin fuse increases when the device current exceeds the current threshold so that the polymer resin fuse is high impedance.

Embodiments of the present disclosure set insurance apparatus on the first output terminal and second output terminal of the integrated chip to limit the current flowed through the first insurance part and second insurance part under short-circuiting or overloading to prevent the integrated circuit from damage and the risk of emitting smoke and causing a security incident.

BRIEF DESCRIPTION OF THE DRAWINGS

In order to make the descriptions of the technique solutions of the embodiments of the present disclosure or the existed techniques, the drawings necessary for describing the embodiments or the existed techniques are briefly introduced below. Obviously, the drawings described below are only some embodiments of the present disclosure, and, for those with ordinary skill in this field, other drawings can be obtained from the drawings described below without creative efforts.

DETAILED DESCRIPTION OF PREFERRED EMBODIMENTS

The technical solutions in the embodiments of the present disclosure will be described clearly and completely hereinafter with reference to the accompanying drawings in the embodiments of the present disclosure. Apparently, the described embodiments are merely a part but not all embodiments of the present disclosure. All other embodiments obtained by persons of ordinary skill in the art based on the embodiments of the present disclosure without creative efforts shall fall within the protection scope of the present disclosure.

It should be understood that the terms "comprise" and "comprising", when used in this specification and the appended claims, indicate the presence of stated features, integers, steps, operations, elements, and/or components, but do not preclude the presence or addition of one or a plurality of other features, integers, steps, operations, elements, components, and/or groups thereof.

It is also to be understood that the terminology used in the description of the disclosure herein is for the purpose of describing particular embodiments only and is not intended to limit the disclosure. As used in the description of the disclosure and the appended claims, the singular forms "a", "an" and "the" are intended to include the plural forms unless the context clearly indicates otherwise.

It is further understood that the term "and/or" as used in the specification and appended claims refers to any and all possible combinations of one or more of the associated listed items.

As used in this specification and the appended claims, the term "if" may be interpreted as "when" or "once" or "in response to a determination" or "in response to a detection" as the context. Similarly, the phrase "if determined" or "if [described condition or event] is detected" may be interpreted from the context to mean "once determined" or "in response to a determination" or "once the [described condition or event]" or "in response to detecting [described condition or event]".

Figure 1:
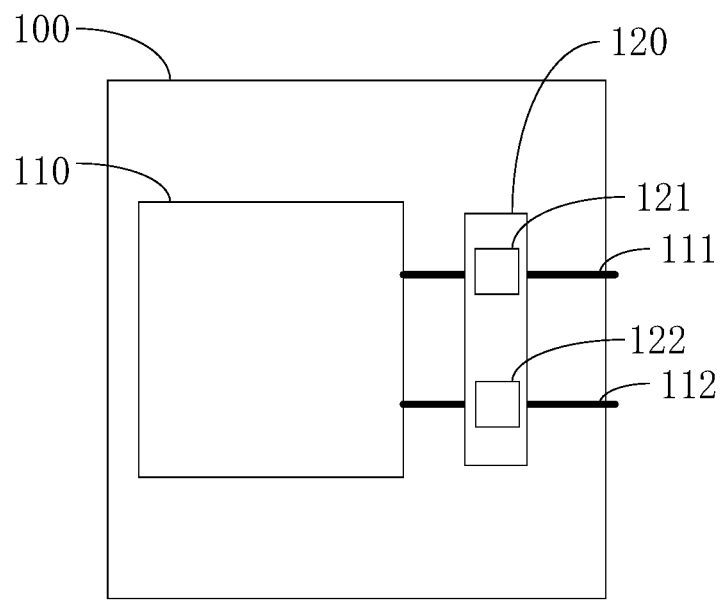
FIG. 1 is a schematic diagram of an anti-short-circuit integrated chip provided by the embodiment of the present disclosure.

Please refer to FIG. 1, which is a schematic diagram of an anti-short-circuit integrated chip provided by the embodiment of the present disclosure. As shown in FIG. 1, the integrated chip 100 in the present embodiment comprises: a control unit 110 and an insurance apparatus 120.

In the present embodiment, the integrated chip 100 (IC, also known as micro circuit, micro chip or integrated circuit) is a microelectronic device or component, which is a microstructure having functions of necessary circuits formed by using certain process to interconnect transistors, resistors, capacitors, inductors and wirings together, using semiconductor process to manufacture them on one or several small semiconductor chips or substrates, and packaging them in a small tube. In the present embodiment, the integrated chip 100 could be one of the analog integrated circuit, digital integrated circuit and digital/analog mixed integrated circuit. Wherein, the analog integrated circuit is also known as a linear circuit to generate, amplify and process analog signals (i.e. the signals whose amplitude varies with time, such as the radio signal of a semiconductor radio or magnetic tape signal of a recorder), and the input signal and the output signal are proportional related. The digital integrated circuit is used for generating, amplifying and processing digital signals (i.e. the signals having discrete values in time and amplitude, such as the logic control signals, playback audio signals and playback video signals of 3G mobile phones, digital cameras, computer CPUs and digital TVs). In the present embodiment, the integrated chip 100 includes but not limited to semiconductor integrated chip and thin film integrated circuit. The integrated chip 100 could further be one of the bipolar integrated circuit and the unipolar integrated circuit. According to the level of integration, the integrated chip 100 may be a small-scale integrated circuit, a medium-scale integrated circuit, a large-scale integrated circuit, a very large-scale integrated circuit, an ultra-large-scale integrated circuit or a gigantic-scale integrated circuit. It is to be understood that the above examples are by way of example only and are not limited thereto.

In the present embodiment, the control unit 110 is a circuit in the integrated chip 100 with specific functions. The circuit comprises two output terminals, that is, the first output terminal 111 and the second terminal 112. Wherein, the first output terminal 111 is configured for outputting a first signal, and the second output terminal 112 is configured for outputting a second signal. It can be understood that the specific function of the control unit 110 can be divided, by technique field, into used for television, used for audio, used for DVD player, used for VCR, used for PC (computer), used for keyboard, used for communication, used for camera, used for remote control, used for language processing or used for alarm, etc. For example, the control unit 110 could be used for simply amplifying signals, or the control unit 110 could be used for processing complex audio/video signals. In the present embodiment, the first signal and the second signal could be forward signals or reverse signals, that is, the current of the signals could flow from the output terminals of the control unit 110 to the external circuit, or flow from the external circuit to the control unit 110. It is noted that, the control unit 110 might be the only one circuit unit in the integrated chip 100 or one of a plurality of circuit units. When the control unit 110 is the only one circuit unit in the integrated chip 110, the function of the integrated chip 100 is the function of the control unit 110; when the control unit 110 is one of the circuit units, the control unit 110 completes the specific function alone or completes some functions through cooperating with other circuit units.

In the present embodiment, the insurance apparatus 120 is configured for protecting the control unit 110 from damage when the external circuit connected to the control unit 110 is short-circuited or over-loaded. The insurance apparatus 120 comprises a first insurance part 121 and a second insurance part 122, the first insurance part 121 is connected to the first output terminal 111, and the second insurance 122 is connected to the second output terminal 112, wherein, the first insurance part 121 is configured for limiting a current flowed through the first insurance part 121 when the current flowed through the first insurance part 121 exceeds a current threshold, and the second insurance part 122 is configured for limiting a current flowed through the second insurance part 122 when the current flowed through the second insurance part 122 exceeds the current threshold. Furthermore, the insurance apparatus 120 may be a short circuit protection circuit, a protection element, and the like. The protection element may be a resistance type fuse, a recoverable fuse, a fuse type fuse, or the like.

The present embodiment sets insurance apparatus on the first output terminal and second output terminal of the control unit to limit the current flowed through the first insurance part and second insurance part under short-circuiting or overloading to prevent the integrated chip from damage and the risk of emitting smoke and causing a security incident.

Figure 2:
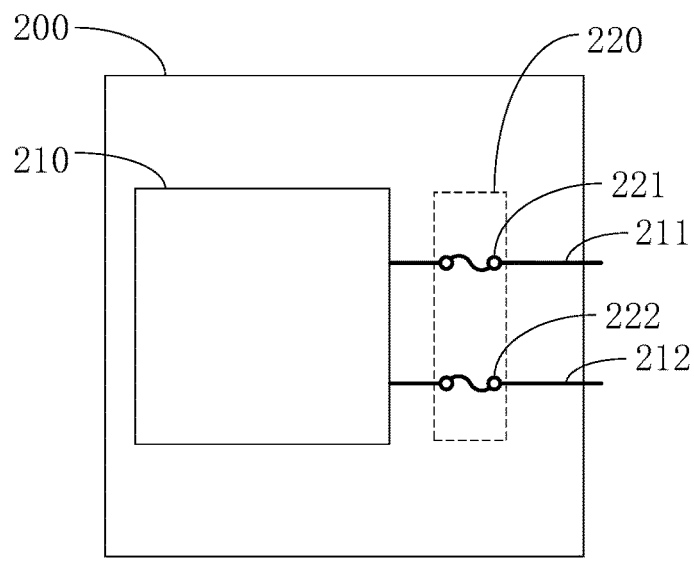
FIG. 2 is a schematic diagram of another anti-short-circuit integrated chip provided by the embodiment of the present disclosure.

Please refer to FIG. 2, which is a schematic diagram of another anti-short-circuit integrated chip provided by the embodiment of the present disclosure. As shown in FIG. 2, the integrated chip 200 of the present embodiment comprises: a control unit 210 and a recoverable fuse device 220.

Figure 3:
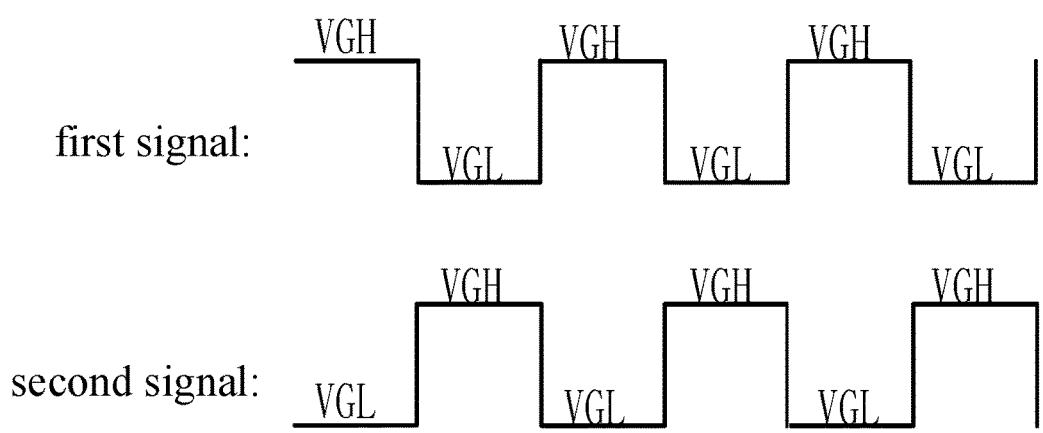
FIG. 3 is the timing diagram of the first signal and second signal used in the embodiment of the present disclosure.

In the present embodiment, the control unit 210 comprises two output terminals, that is, the first output terminal 211 and the second output terminal 212. The first output terminal 211 is configured for outputting the first signal and the second output terminal 212 is configured for outputting the second signal. Furthermore, the first signal is a periodic signal with positive and negative alternating, the second signal is in 180° phase difference with the first signal, and a voltage difference between the first signal and the second signal is kept at a constant difference value. For example, the control unit 210 is a level converting circuit, and the two signals could be the high voltage level signal VGH and the low voltage level signal VGL, whose waveform is shown in FIG. 3, output to the gate driver on array (GOA) circuit. Because the voltage difference between the two signals is kept at a constant positive/negative difference value, a large current would be generated when the external circuit connected to the two output terminals is short-circuited, which would result in emitting smoke and causing a security incident on the control unit 210 or the entire integrated chip 200.

In the present embodiment, the recoverable fuse device 220 comprises a first device part 221 and a second device part 222. The first device part 221 is connected to the first output terminal 211, and the second device part 222 is connected to the second output terminal 212. The recoverable fuse device 220 is low impedance when a device current does not exceed the current threshold so that the first output terminal 211 and the second output terminal 212 of the control unit 210 could output signals normally. The recoverable fuse device 220 is high impedance when the device current exceeds the current threshold to limit the device current so that the control unit 210 is prevented from being damaged due to the large current. Wherein, the device current is a current flowed through the recoverable fuse device 220. Furthermore, the recoverable fuse device is an over current electronic protection element formed by adopting organic polymer, adding conductive particle material under the condition of high pressure, high temperature and vulcanization reaction, and going through a special process. The over-current protection adopted by traditional fuses can only provide protection once, and the fuses need to be replaced after being burned. The recoverable fuse device 220 provides two functions of over-current and over-temperature protection and automatic recovery.

In the present embodiment, the recoverable fuse device 220 could be a polymer resin fuse, wherein the polymer resin fuse is composed of specific processed polymer resin and conducting particles (Carbon Black) distributed therein. When the fuse is under normal operation, the polymer bonds the conducting particles tightly to outside of the crystalline structure to form a chain-shaped electrical conducting path, and, at this time, the polymer resin fuse is low impedance, the heat generated by the current flowed through the polymer resin fuse is too small to change the crystalline structure. When short-circuiting or overloading occurs, the heat generated by the large current flowed through the polymer resin fuse would melts the polymer resin so that the volume of the polymer resin fuse is increased and is changed to be high impedance, and the working current is reduced rapidly to limit and protect the circuit. After the failure is rectified, the polymer resin fuse re-cools and crystallizes, the volume reduces, the conductive particles re-form the conductive path, and the polymer resin fuse returns to be low impedance, thereby completing the circuit protection without manual replacement.

The present embodiment sets recoverable fuse device on the two output terminals of the control unit having constant voltage difference to smartly limit the current flowed through output terminals by the recoverable fuse device so that the control unit is prevent from damage and the risk of emitting smoke and causing a security incident effectively.

Embodiments of the present disclosure further provides an anti-short-circuit terminal facility. Please refer to both FIG. 1 and FIG. 2 for understanding. The terminal facility comprises a terminal body and an integrated chip, wherein the integrated chip comprises a control unit and a fuse apparatus.

In the embodiments of the present disclosure, the integrated chip (IC, also known as micro circuit, micro chip or integrated circuit) is a microelectronic device or component, which is a micro-structure having functions of necessary circuits formed by using certain process to interconnect transistors, resistors, capacitors, inductors and wirings together, using semiconductor process to manufacture them on one or several small semiconductor chips or substrates, and packaging them in a small tube. In the present embodiment, the integrated chip could be one of the analog integrated circuit, digital integrated circuit and digital/analog mixed integrated circuit. Wherein, the analog integrated circuit is also known as a linear circuit to generate, amplify and process analog signals (i.e. the signals whose amplitude varies with time, such as the radio signal of a semiconductor radio or magnetic tape signal of a recorder), and the input signal and the output signal are proportional related. The digital integrated circuit is used for generating, amplifying and processing digital signals (i.e. the signals having discrete values in time and amplitude, such as the logic control signals, playback audio signals and playback video signals of 3G mobile phones, digital cameras, computer CPUs and digital TVs). In the present embodiment, the integrated chip includes but not limited to semiconductor integrated chip and thin film integrated circuit. The integrated chip could further be one of the bipolar integrated circuit and the unipolar integrated circuit. According to the level of integration, the integrated chip may be a small-scale integrated circuit, a medium-scale integrated circuit, a large-scale integrated circuit, a very large-scale integrated circuit, an ultra-large-scale integrated circuit or a gigantic-scale integrated circuit. It is to be understood that the above examples are by way of example only and are not limited thereto.

In the present embodiment, the control unit is a circuit in the integrated chip 100 with specific functions. The circuit comprises two output terminals, that is, the first output terminal and the second terminal. Wherein, the first output terminal is configured for outputting a first signal, and the second output terminal is configured for outputting a second signal. It can be understood that the specific function of the control unit can be divided, by technique field, into used for television, used for audio, used for DVD player, used for VCR, used for PC (computer), used for keyboard, used for communication, used for camera, used for remote control, used for language processing or used for alarm, etc. For example, the control unit could be used for simply amplifying signals, or the control unit could be used for processing complex audio/video signals. In the present embodiment, the first signal and the second signal could be forward signals or reverse signals, that is, the current of the signals could flow from the output terminals of the control unit to the external circuit, or flow from the external circuit to the control unit. It is noted that, the control unit might be the only one circuit unit in the integrated chip or one of a plurality of circuit units. When the control unit is the only one circuit unit in the integrated chip, the function of the integrated chip is the function of the control unit; when the control unit is one of the circuit units, the control unit completes the specific function alone or completes some functions through cooperating with other circuit units.

In the present embodiment, the insurance apparatus is configured for protecting the control unit from damage when the external circuit connected to the control unit is short-circuited or over-loaded. The insurance apparatus comprises a first insurance part and a second insurance part, the first insurance part is connected to the first output terminal, and the second insurance is connected to the second output terminal, wherein, the first insurance part is configured for limiting a current flowed through the first insurance part when the current flowed through the first insurance part exceeds a current threshold, and the second insurance part is configured for limiting a current flowed through the second insurance part when the current flowed through the second insurance part exceeds the current threshold. Furthermore, the insurance apparatus may be a short circuit protection circuit, a protection element, and the like. The protection element may be a resistance type fuse, a recoverable fuse, a fuse type fuse, or the like.

The present embodiment sets insurance apparatus on the first output terminal and second output terminal of the integrated chip to limit the current flowed through the first insurance part and second insurance part under short-circuiting or overloading to prevent the integrated chip from damage and the risk of emitting smoke and causing a security incident.

The above description introduces the components involved in the terminal facility according to the embodiment of the present disclosure. A specific terminal facility for preventing short-circuit will be further described below. The terminal facility includes a terminal body and an integrated chip, where the integrated chip comprises a control unit and a recoverable fuse device.

In the embodiment of the present disclosure, the control unit comprises two output terminals, that is, the first output terminal and the second output terminal. The first output terminal is configured for outputting the first signal and the second output terminal is configured for outputting the second signal. Furthermore, the first signal is a periodic signal with positive and negative alternating, the second signal is in 180° phase difference with the first signal, and a voltage difference between the first signal and the second signal is kept at a constant difference value. For example, the control unit is a level converting circuit, and the two signals could be the high voltage level signal VGH and the low voltage level signal VGL, whose waveform is shown in FIG. 3, output to the gate driver on array (GOA) circuit. Because the voltage difference between the two signals is kept at a constant positive/negative difference value, a large current would be generated when the external circuit connected to the two output terminals is short-circuited, which would result in emitting smoke and causing a security incident on the control unit or the entire integrated chip.

In the embodiments of the present disclosure, the recoverable fuse device is low impedance when a device current does not exceed the current threshold so that the first output terminal and the second output terminal of the control unit could output signals normally. The recoverable fuse device is high impedance when the device current exceeds the current threshold to limit the device current so that the control unit is prevented from being damaged due to the large current. Wherein, the device current is a current flowed through the recoverable fuse device. Furthermore, the recoverable fuse device is an over current electronic protection element formed by adopting organic polymer, adding conductive particle material under the condition of high pressure, high temperature and vulcanization reaction, and going through a special process. The over-current protection adopted by traditional fuses can only provide protection once, and the fuses need to be replaced after being burned. The recoverable fuse device provides two functions of over-current and over-temperature protection and automatic recovery.

In the embodiments of the present disclosure, the recoverable fuse device could be a polymer resin fuse, wherein the polymer resin fuse is composed of specific processed polymer resin and conducting particles (Carbon Black) distributed therein. When the fuse is under normal operation, the polymer bonds the conducting particles tightly to outside of the crystalline structure to form a chain-shaped electrical conducting path, and, at this time, the polymer resin fuse is low impedance, the heat generated by the current flowed through the polymer resin fuse is too small to change the crystalline structure. When short-circuiting or overloading occurs, the heat generated by the large current flowed through the polymer resin fuse would melts the polymer resin so that the volume of the polymer resin fuse is increased and is changed to be high impedance, and the working current is reduced rapidly to limit and protect the circuit. After the failure is rectified, the polymer resin fuse re-cools and crystallizes, the volume reduces, the conductive particles re-form the conductive path, and the polymer resin fuse returns to be low impedance, thereby completing the circuit protection without manual replacement.

The embodiments of the present disclosure set recoverable fuse device on the two output terminals of the control unit having constant voltage difference to smartly limit the current flowed through output terminals by the recoverable fuse device so that the control unit is prevent from damage and the risk of emitting smoke and causing a security incident effectively.

The foregoing contents are detailed description of the disclosure in conjunction with specific preferred embodiments and concrete embodiments of the disclosure are not limited to the description. For the person skilled in the art of the disclosure, without departing from the concept of the disclosure, simple deductions or substitutions can be made and should be included in the protection scope of the application.

What is claimed is:

1. An anti-short-circuit integrated chip, comprising:
   a control unit disposed in a chip body, comprising a first output terminal and a second output terminal, wherein the first output terminal is configured for outputting a first signal, and the second output terminal is configured for outputting a second signal; and
   an insurance apparatus disposed in the chip body, comprising a first insurance part and a second insurance part, the first insurance part being connected to the first output terminal, the second insurance part being connected to the second output terminal, the first insurance part being configured for limiting a current flowed through the first insurance part when the current flowed through the first insurance part exceeds a current threshold, and the second insurance part being configured for limiting a current flowed through the second insurance part when the current flowed through the second insurance part exceeds the current threshold;
   wherein the first signal is a periodic signal with positive and negative alternating, the second signal is in 180° phase difference with the first signal, and a voltage difference between the first signal and the second signal is kept at a constant difference value.

2. The anti-short-circuit integrated chip according to claim 1, wherein the insurance apparatus is a recoverable fuse device; the recoverable fuse device is low impedance when a device current does not exceed the current threshold and is high impedance when the device current exceeds the current threshold, wherein the device current is a current flowed through the recoverable fuse device.

3. The anti-short-circuit integrated chip according to claim 2, wherein the recoverable fuse device is a polymer resin fuse.

4. The anti-short-circuit integrated chip according to claim 3, wherein a volume of the polymer resin fuse decreases when the device current does not exceed the current threshold so that the polymer resin fuse is low impedance; and the volume of the polymer resin fuse increases when the device current exceeds the current threshold so that the polymer resin fuse is high impedance.

5. An anti-short-circuit terminal facility, comprising a terminal body and an integrated chip, wherein the integrated chip comprises:
   a control unit disposed in a chip body, comprising a first output terminal and a second output terminal, wherein the first output terminal is configured for outputting a first signal, and the second output terminal is configured for outputting a second signal; and
   an insurance apparatus disposed in the chip body, comprising a first insurance part and a second insurance part, the first insurance part being connected to the first output terminal, the second insurance part being connected to the second output terminal, the first insurance part being configured for limiting a current flowed through the first insurance part when the current flowed through the first insurance part exceeds a current threshold, and the second insurance part being configured for limiting a current flowed through the second insurance part when the current flowed through the second insurance part exceeds the current threshold;
   wherein the first signal is a periodic signal with positive and negative alternating, the second signal is in 180° phase difference with the first signal, and a voltage difference between the first signal and the second signal is kept at a constant difference value.

6. The anti-short-circuit terminal facility according to claim 5, wherein the insurance apparatus is a recoverable fuse device; the recoverable fuse device is low impedance when a device current does not exceed the current threshold and is high impedance when the device current exceeds the current threshold, wherein the device current is a current flowed through the recoverable fuse device.

7. The anti-short-circuit terminal facility according to claim 6, wherein the recoverable fuse device is a polymer resin fuse.

8. The anti-short-circuit terminal facility according to claim 7, wherein a volume of the polymer resin fuse decreases when the device current does not exceed the current threshold so that the polymer resin fuse is low impedance; and the volume of the polymer resin fuse increases when the device current exceeds the current threshold so that the polymer resin fuse is high impedance.

* * * * *